United States Patent [19]
D'Sa et al.

[11] Patent Number: 6,055,630
[45] Date of Patent: Apr. 25, 2000

[54] SYSTEM AND METHOD FOR PROCESSING A PLURALITY OF BRANCH INSTRUCTIONS BY A PLURALITY OF STORAGE DEVICES AND PIPELINE UNITS

[75] Inventors: Reynold V. D'Sa; Alan B. Kyker, both of Portland; Gad S. Sheaffer, Beaverton; Gustavo P. Espinosa; Stavros Kalafatis, both of Portland; Rebecca E. Hebda, Sherwood, all of Oreg.

[73] Assignee: Intel Corporation, Hillsboro, Oreg.

[21] Appl. No.: 09/063,205

[22] Filed: Apr. 20, 1998

[51] Int. Cl.[7] .................................................. G06F 13/14
[52] U.S. Cl. .......................... 712/240; 712/203; 712/214; 712/238; 712/239
[58] Field of Search ..................................... 712/126, 212, 712/213, 203, 215, 235, 236, 238, 239, 240, 214

[56] References Cited

U.S. PATENT DOCUMENTS

| | | | |
|---|---|---|---|
| 5,381,533 | 1/1995 | Peleg et al. .............................. | 712/215 |
| 5,574,871 | 11/1996 | Hoyt et al. ............................... | 712/200 |
| 5,577,217 | 11/1996 | Hoyt et al. ............................... | 712/200 |
| 5,584,001 | 12/1996 | Hoyt et al. ............................... | 712/238 |
| 5,604,877 | 2/1997 | Hoyt et al. ............................... | 712/243 |

*Primary Examiner*—Daniel H. Pan
*Assistant Examiner*—Dzung Nguyen
*Attorney, Agent, or Firm*—Kenyon & Kenyon

[57] ABSTRACT

An instruction pipeline in a microprocessor is provided. The instruction pipeline includes a plurality of pipeline units, each of the pipeline units processing a plurality of instructions including branch instructions. The instruction pipeline further includes a plurality of storage device which store a respective branch information data. Each of the storage devices are associated with at least one of pipeline units. Each respective branch information data is determined as a function of at least one of the branch instructions processed. Two of the pipeline units include branch prediction circuitry for predicting branch direction as a function of the stored branch information data.

23 Claims, 6 Drawing Sheets

SYSTEM AND METHOD FOR PROCESSING A PLURALITY OF BRANCH INSTRUCTIONS BY A PLURALITY OF STORAGE DEVICES AND PIPELINE UNITS

FIELD OF THE INVENTION

The present invention is directed to improvements to an instruction pipeline in a central processing unit. In particular, the present invention is directed to the maintenance of information related to branch instructions.

BACKGROUND INFORMATION

Modern central processing units (CPUs) include instruction pipelines in order to increase program execution speed. In general, in an instruction pipeline, program instructions are fetched and decoded in such a way that, at any given time, several program instructions are in various stages of being fetched or decoded. Pipelining speeds execution time by attempting to ensure that the execution unit of the microprocessor does not have to wait for instructions. Ideally, when the execution unit completes execution of one instruction, another instruction has been fetched and decoded, and is ready to be executed. One exemplary pipelined microprocessor is Intel's Pentium® Pro. In order for a pipelined microprocessor to operate efficiently, instructions are continuously fetched and fed into the pipeline. In most cases, the fetch unit knows in advance the address of the next instruction to be fetched—typically the next sequential address. When a conditional branch instruction is fetched, however, the fetch unit is prevented from fetching subsequent instructions until the branch condition is fully resolved. In a pipelined microprocessor, the branch condition may not be fully resolved until the branch instruction reaches nearly the end of the pipeline and is executed. Accordingly, the fetch unit stalls because the unresolved branch condition prevents the fetch unit from knowing which instructions to fetch next.

To alleviate this problem, some microprocessors, such as Intel's Pentium® and Pentium®) Pro microprocessors, utilize branch prediction logic to predict the outcome of a branch condition, and, accordingly, the branch direction (i.e., "taken" or "not taken"). The fetch unit then uses the branch prediction to determine which instruction to fetch next. If the branch prediction logic predicts that the branch will be taken, the fetch unit fetches the instruction at the branch target address. If the branch prediction logic predicts that the branch will not be taken, the fetch unit continues to fetch instruction is sequential order.

In Intel's Pentium® Pro microprocessor, branch prediction is based, at least in part, on the history of each branch. In particular, the memory address from which a branch instruction was fetched is used to perform a lookup in a branch target buffer (BTB), a high-speed look-aside cache. If the branch is not in the branch target buffer, i.e., a cache miss, the branch is predicted as not taken and the fetch unit continues to fetch instructions sequentially.

If the branch is in the branch target buffer, i.e., a cache hit, the state of the branch target buffer entry's "history bits" is used to determine whether the branch should be predicted as taken or not taken. If the branch is predicted as taken, the fetch unit fetches instructions starting at the branch target address. If the branch is predicted as not taken, the fetch unit continues to fetch instruction sequentially.

When the branch is fully resolved, for example, at instruction retirement, the results (i.e., whether the branch was taken or not, and if taken, the branch target address) are used to update the branch target buffer. Exemplary embodiments of the branch target buffer are described in detail in U.S. Pat. No. 5,574,871 to Hoyt et al., U.S. Pat. No. 5,577,217 to Hoyt et al., U.S. Pat. No. 5,584,001 to hoyt et al.

In deeply pipelined systems, such as Intel's Pentium® Pro microprocessor, branch mispredictions are quite costly. If a branch is mispredicted, the instructions in the pipeline following the branch instruction (i.e., upstream in the pipeline) are incorrect. Accordingly, the pipeline must be flushed, and the pipeline must be restarted. It is therefore extremely important that the branch predictions be as accurate as possible.

The above-described branch prediction mechanism works reasonably well in a system having a single instruction source and a single restart point. However, such a mechanism is not adequate for a system having multiple instruction sources, and for a system in which the instruction pipeline may be restarted at any one of a number of restart points.

SUMMARY OF THE INVENTION

In an exemplary embodiment of the present invention, an instruction pipeline in a microprocessor is provided. The instruction pipeline includes a plurality of pipeline units, each of the pipeline units processing a plurality of instructions including branch instructions. The instruction pipeline further includes a plurality of storage device which store respective branch information data (e.g., branch history information, information regarding branch addresses, information regarding branch target address, etc.). Each of the storage devices are associated with at least one of pipeline units. Each respective branch information data is determined as a function of at least one of the branch instructions processed.

In accordance with the exemplary embodiment, two of the pipeline units include branch prediction circuitry for predicting branch direction as a function of the stored branch information data.

DETAILED DESCRIPTION

Figure 1A:
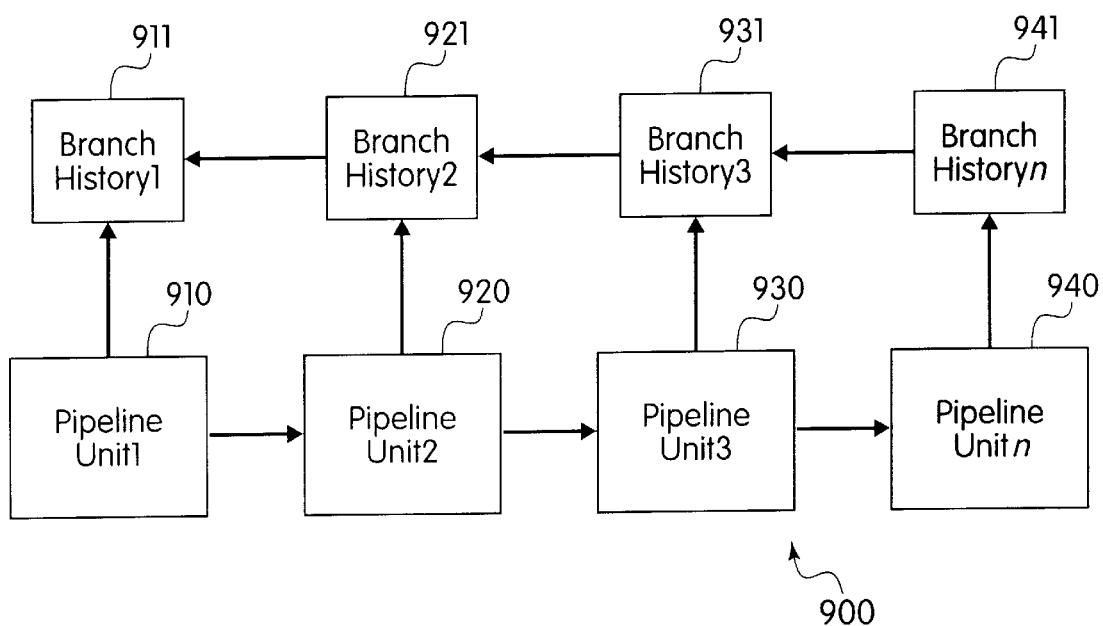
FIG. 1a illustrates a block diagram of the overall architecture of an exemplary embodiment of the present invention.

Overall System Architecture: Referring now to the drawings, and initially to FIG. 1a, there is illustrated the overall system architecture of the present invention. As shown, instruction pipeline 900 includes a plurality of pipeline units, i.e., pipeline unit1 910, pipeline unit2 920, pipeline unit3 930 and pipeline unit 940. Although four pipeline units are illustrated, the instruction pipeline 900 may include more or less units. Additionally, although the pipeline units of pipeline 900 are illustrated as coupled in series, alternative connections are possible. For example, pipeline unit3 930 may be connected in parallel with another unit, such as, for example, pipeline unit2 920.

Pipeline unit1 910 may be, for example, an instruction source for pipeline 900. That is, pipeline unit1 910 may fetch instructions from, for example, main memory, cache memory, etc., and provide the fetched instructions to the instruction pipeline 900 for processing. In the embodiment illustrated, each pipeline unit processes instructions received from an upstream pipeline unit, and then passes the processed instructions to the next downstream unit. For example, pipeline unit2 920 may receive instructions from pipeline unit1 910, and may decode the received instructions. The decoded instructions may then be passed to pipeline unit3 930. (Of course, in some processors, instructions do not require decoding. In such a processor, the instruction pipeline 900 would not need a decode unit.)

In accordance with the present invention, a second instruction source may be included in pipeline 900. For example, pipeline unit3 930 may fetch instructions from, for example, main memory, cache memory, etc., and provide instructions to pipeline 900. In such a system, pipeline unit3 930 may provide instructions to pipeline 900 during a time that pipeline unit1 910 is not providing instructions to pipeline 900. That is, typically, only one pipeline unit provides instructions to pipeline 900 at any given time (although in particular architectures, it may be possible that multiple units provide instructions to pipeline 900 simultaneously).

Instruction pipeline 100 also includes an instruction execution unit. For example, pipeline unit 940 may receive instructions from an upstream pipeline unit, and execute the instructions, either in the order received, or out-of-order sequence (depending on, for example, the particular architecture of the processor.)

Pipeline 900 includes branch prediction circuitry. In particular, an instruction source, such as, for example, pipeline unit1 910 may fetch instructions sequentially. However, after a branch instruction is fetched, the next sequential instruction may not be the instruction that should be fetched next. If, the branch instruction is an unconditional branch, for example, it would be desirable to instead fetch the instruction at the target address of the branch instruction. Thus, pipeline unit1 910 may include branch prediction circuitry so that after a branch instruction is fetched, pipeline unit1 910 may determine which instruction should be fetched next. In the case of unconditional branch instructions, static predictions may be made. For example, the branch prediction circuitry may determine that unconditional branches will always be taken (where "taken" means jump to the branch target address and "not taken" means to go to the next sequential instruction). However, the branch prediction circuitry may also make dynamic predictions. In the case of a conditional branch instruction, it is not known in advance of execution whether the branch will be taken or not taken. Thus, branch prediction circuitry may predict branch direction (i.e., taken or not taken) based on, for example, the "history" of branch instructions. Thus, branch information may be maintained. The branch information may provide an indication as to whether the last N branch instruction were predicted as (or actually) taken or not taken(e.g., branch history) or may provide an indication of complete or partial branch instruction addresses or branch target addresses. The branch information may be specific to each branch, for example, a table may be maintained indicating the address of branch instructions and an indication of whether or not the particular branch instruction was taken or not taken). Or, the branch information may be in a "global" form. For example, the branch information may indicate for each of the last N branch instructions, whether or not the branch instructions were predicted as (or actually) taken or not taken, without regard for the specific branch instruction. Other forms of branch information are, of course, possible.

In the exemplary embodiment of the present invention, each of the pipeline units of instruction pipeline 900 maintains respective branch information data, i.e., branch history1 911, branch history2 921, branch history3 931 and branch history 941 (in an alternative embodiment, not all of the pipeline units maintain a branch history). For at least some of the branch instructions processed and recognized by each pipeline unit, the pipeline unit updates its respective branch information data.

Each respective branch information data is maintained by each pipeline unit in cooperation with other pipeline units. In particular, if a pipeline unit detects that a branch direction was incorrectly predicted by an upstream pipeline unit, the unit that detected the misprediction "back-propagates" its respective branch information data. For example, if pipeline unit 940 detects that a branch direction was mispredicted by, for example, branch prediction circuitry of pipeline unit1 910, pipeline unit 940 transmits its respective branch history 940 to the upstream pipeline units, i.e., pipeline unit3 930, pipeline unit2 920 and pipeline unit1 910. Each of these upstream pipeline units may then use the received branch information data to update its own respective branch information data. Alternatively, pipeline unit 940 may simply copy branch history 941 to each upstream branch history, i.e., branch history3 931, branch history2 921 and branch history1 911. Or, pipeline unit 940 may cause another unit in the pipeline to perform the copying or updating.

Additionally, in an instruction pipeline having more than one instruction source, branch information data may be, for example, back-propagated each time the source of instructions switches from a downstream pipeline unit to an upstream pipeline unit. For example, when pipeline unit3 930 provides instructions to pipeline 900, since pipeline unit1 910 and pipeline unit2 920 are upstream from pipeline unit3 930, neither pipeline unit1 910 nor pipeline unit2 920 sees (or processes) the instructions provided by pipeline unit3 930. Thus, neither branch history1 911 nor branch history2 921 reflects the information concerning branch instructions provided by pipeline unit3 930. In accordance with the exemplary embodiment of the present invention, each time the source of instructions switches from a downstream unit (for example, pipeline unit3 930) to an upstream unit (for example, pipeline unit1 910), downstream branch information data is back-propagated. Thus, the upstream branch information data are updated with current information.

Figure 1B:
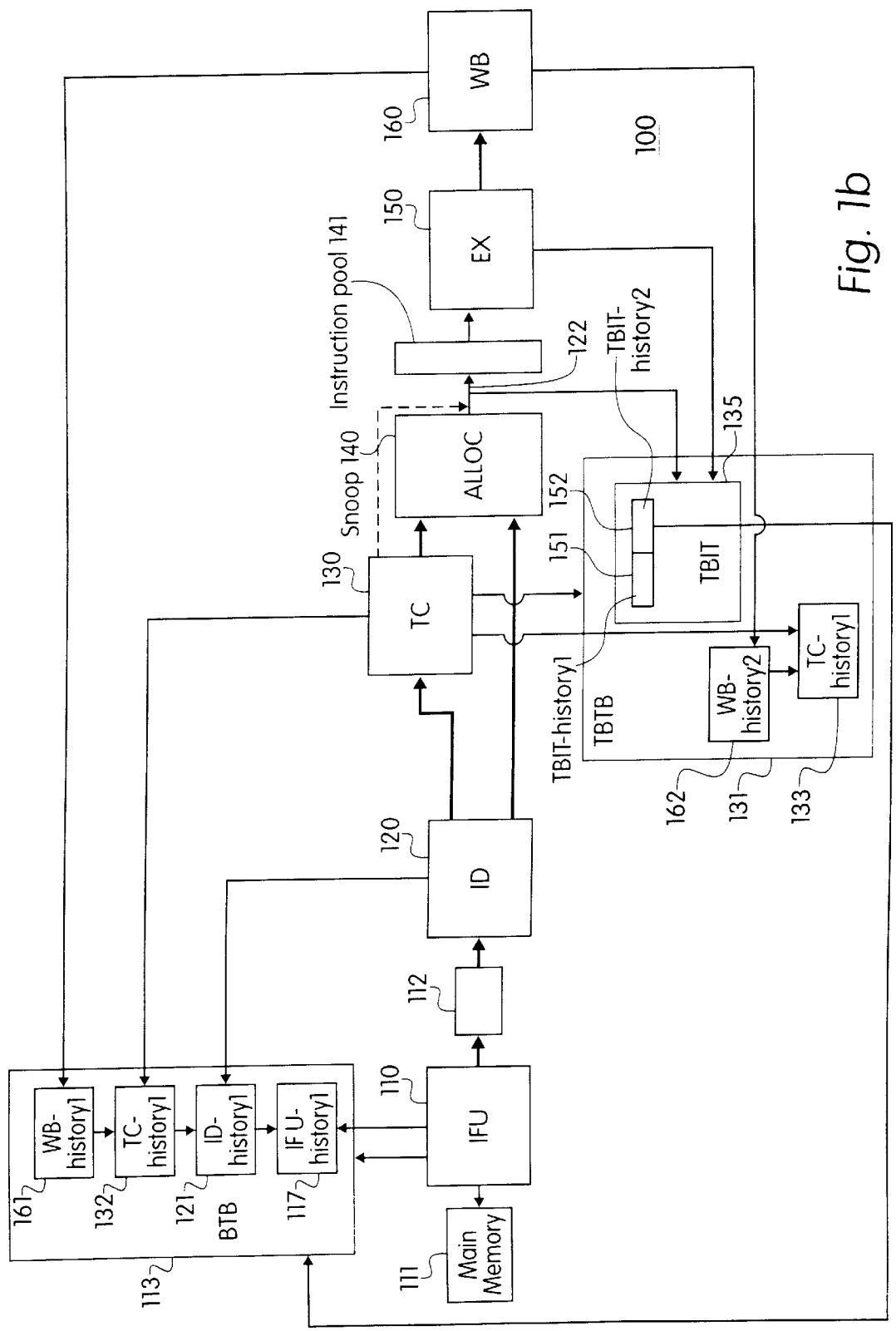
FIG. 1b illustrates a block diagram of the overall architecture of an additional exemplary embodiment of the present invention.

Overview Of An Additional Exemplary Embodiment: FIG. 1b illustrates an additional exemplary embodiment of the present invention. This embodiment illustrates the present invention as applied to, for example, an instruction pipeline for processing Intel Architecture (i.e., x86) instructions (e.g., IA-32). As a person of ordinary skill in the art will understand, however, the present invention may be applied to instruction pipelines of other processor architectures, such as, for example, RISC and CISC architectures, or any processor architecture that includes the use of an instruction pipeline.

Referring now to FIG. 1b, there is illustrated an exemplary instruction pipeline 100 in accordance with the present invention. Instruction pipeline 100 may include, for example, six major stages or units (each of the pipeline stages or units may actually be comprised of a number sub-stages), including an instruction fetch unit (IFU) 110, an instruction decode unit (ID) 120. a trace cache unit(trace cache unit) 130, an allocation unit (ALLOC) 140, an execution unit (EX) 150, and a write-back unit (WB) 160.

In the exemplary embodiment of the present invention, instruction fetch unit 110 is a source of program instructions for instruction pipeline 100. In particular, instruction fetch unit 110 fetches, for example, macro-code instructions from main memory 111 in strict program order in order to provide pipeline 100 with a stream of instructions. When a branch instruction is detected, branch prediction logic at instruction fetch unit 110, in particular, a branch target buffer (BTB) 113 makes a dynamic prediction as to whether or not the branch will be taken or not taken when the branch is eventually executed. (branch target buffer 113 makes a branch prediction for every macro-code branch instruction it recognizes). If branch target buffer 113 predicts that the branch will not be taken, instruction fetch unit 110 continues to fetch instructions sequentially. If branch target buffer 113 instead predicts that a branch will be taken, branch target buffer 113 instructs instruction fetch unit 110 to fetch instructions starting from the branch target address. In this manner, instruction fetch unit 110 does not have to wait for any conditions on the branch to be fully resolved before it fetches further instructions. In the exemplary embodiment, if branch target buffer 113 does not recognize that a particular instruction is a branch instruction (even though it is, in fact, a branch instruction), it will not make a branch prediction, and instruction fetch unit 110 continues fetching instructions sequentially.

Instruction fetch unit 110 pushes each fetched instruction into pipeline 100. If the fetched instruction is a branch instruction (and branch target buffer 113 recognizes the instruction as such), instruction fetch unit 110 also pushes into pipeline 100 a branch prediction bit (not shown) indicating whether the branch was taken or not taken by instruction fetch unit 110.

The instructions and data pushed into pipeline 100 may be optionally stored in a series of latches 112 between instruction fetch unit 110 and the next pipeline unit. The number of latches 112 corresponds to the depth of pipeline 100 between instruction fetch unit 110 and the next downstream unit in pipeline 100.

In the exemplary embodiment, instruction decode unit 120 receives the fetched macro-code instructions from instruction fetch unit 110 via latches 112, and processes the macro-code instructions in first-in, first-out (FIFO) order. Instruction decode unit 120 decodes the macro-code instructions into, for example, fixed-length RISC instructions called micro-ops or uops. Each macro-code instruction may decode to one or a number of micro-ops. These micro-ops are assigned sequence numbers by allocation unit 140, and are temporarily stored in an instruction pool 141.

In the exemplary embodiment of the present invention, instruction pipeline 100 includes a second source of program instructions. In particular, trace cache unit 130 stores instruction sequences, in the form of micro-ops, in high speed cache memory in order to later provide these instructions to allocation unit 140 for execution by execution unit 150.

In accordance with the exemplary embodiment of the present invention, trace cache unit 130 builds and stores instruction "traces" in cache memory. These instruction traces are built while instruction fetch unit 110 is acting as the instruction source (i.e., while trace cache unit 130 is in "build" mode). In particular, for certain instruction sequences, trace cache unit 130 builds and stores (as micro-ops) sequences of macro-code instructions which may be accessed as a block of code, i.e., a "trace segment". If the sequence includes a branch instruction, instructions along only the predicted instruction path (as predicted by branch target buffer 113) are stored. Additionally, trace cache unit 130 stores the branch prediction (as identified by the prediction bit accompanying the branch instruction). The structure and operation of trace cache unit 130 is described in further detail in U.S. Pat. No. 5,381,533 to Peleg et al.

Trace cache unit 130 controls whether the source for instructions entering instruction pool 141 is instruction fetch unit 110 (via instruction decode unit 120) or trace cache unit 130. In particular, trace cache unit 130 snoops the instruction path 122 (between allocation unit 140 and instruction pool 141). If trace cache unit 130 recognizes that an instruction originating from IFU 110 corresponds to the first instruction in an instruction trace segment (a "trace head"), i.e., a trace cache hit, trace cache unit 130 signals instruction fetch unit 110 to discontinue fetching instructions. trace cache unit 130 then provides the appropriate instructions to allocation unit 140 from its cache memory, i.e., trace cache unit 130 enters a "streaming" mode. When trace cache unit 130 detects that further necessary instructions are not in cache (i.e., a trace cache miss), trace cache unit 130 instructs instruction fetch unit 110 to recommence fetching instructions (at an address provided by trace cache unit 130), and trace cache unit 130 discontinues providing instructions to allocation unit 140.

Trace cache unit 130 includes branch prediction circuitry, trace branch target buffer 131. If a trace unit includes a branch instruction, trace branch target buffer 131 dynamically predicts "trace leave" conditions. In particular, as trace cache unit 130 provides trace instructions to allocation unit 140, trace branch target buffer 131 performs its own dynamic prediction as to whether the branch instructions in the trace segment will be taken or not taken.

In the exemplary embodiment of the present invention, execution unit 150 obtains instructions from the instruction pool 141. Execution unit 150 executes the micro-ops in the instruction pool 141 in any order possible as data and execution units required for each micro-op becomes available. Accordingly, execution unit 150 is an out-of-order (OOO) portion of the pipeline.

Finally, write-back unit 160 "retires" each executed micro-op. That is, write-back unit 160 commits the result of each micro-op execution to the processor's register set in the order of original program flow. Thus, write-back unit 160 is an in-order rear end of the pipeline.

Dynamic Branch Prediction: In the exemplary embodiment of the present invention, two units in pipeline 100 perform dynamic branch direction predictions, branch target buffer 113 and trace branch target buffer 131. In particular, for each branch instruction the respective unit detects, branch target buffer 113 and trace branch target buffer 131 make predictions as to whether or not the branch instruction will be taken or not taken when it is eventually executed. Both branch target buffer 113 and trace branch target buffer 131 base their respective predictions, at least in part, on a respective "global branch history." A global branch history may provide, for example, an indication of the direction (i.e., branch taken or not taken) of previous branch instructions. For example, instruction fetch unit 110 maintains a global history, IFU-history1 117, for use by branch target buffer 113 for branch predictions. IFU-history1 117 is maintained local to branch target buffer 113. Correspondingly, trace cache unit 130 maintains a global history, TC-history2 133, for use by trace branch target buffer 131 in making its branch predictions. TC-history2 133 is maintained local to trace branch target buffer 131. Each of branch target buffer 113 and trace branch target buffer 130 expect the histories to be in a different form, thus, instruction fetch unit 110 and trace cache unit 130 use a different method to determine new values for the histories. In a alternative embodiment, branch target buffer 113 and trace branch target buffer 130 may expect the histories to be in the same form, thus it is possible that only one global history be utilized by both branch target buffer 113 and trace branch target buffer 130.

In the exemplary embodiment of the present invention, for each conditional branch instruction it detects and predicts as "taken," instruction fetch unit 110 determines a new value to store into IFU-history1 117 as a function of the old value of IFU-history1 117 and the address of the branch instruction, e.g., "new" value=("old" value XOR addr[3:0]) <<4 (new value equals old value XORed with the lower four bits of the address of the branch instruction, and then left shift by four bits). Accordingly, the lower four bits of the addresses of several prior "taken" branches are maintained in IFU-history1 117. The history of the branch instructions may be calculated or represented using other methods. For example, it is possible that a different function be utilized to determine a new history. Or, IFU-history1 117 may simply include a stack, list, or table of branch predictions (e.g., "TNTTNNT" or "1011001," where "T" or "1" represents branch "taken" stored branch addresses. Other methods for reflecting branch history are of course possible.

In the exemplary embodiment, trace cache unit 130 utilizes a different function for calculating a new history than does instruction fetch unit 110. In particular, for each branch instruction (whether taken or not taken) it detects (snoops) along instruction path 122, trace cache unit 130 determines a new value to store into TC-history2 133 as a function of the old history, the branch address and the prediction (i.e., taken or not taken), e.g., "new" value=("old" value XOR addr[3:0])·prediction (new value equals old value XORed with the lower four bits of the branch address, concatenated with the prediction). Accordingly, the lower four bits of the addresses of several prior branches, as well as the predicted direction of each branch ("taken" or "not taken," where, for example, "taken" may be represented as a "1" while "not taken" may be represented as a "0") are maintained in IFU-history1 117. As with IFU-history1 117, other methods, including, for example, those mentioned above, could be used to reflect branch history.

IFU-history1 117 and TC-history2 133 may be stored in respective shift registers, for example, although another storage device may be used. (The terms IFU-history1 and TC-history2 will be used to refer to the values and additionally to the storage devices storing the values). IFU-history1 117 and TC-history2 133 reflect the history of the branch instructions detected by instruction fetch unit 110 and trace cache unit 130, respectively. As illustrated in FIG. 1b, instruction fetch unit 110 maintains IFU-history1 117 at branch target buffer 113, and trace cache unit 130 maintains TC-history2 133 at trace branch target buffer 131.

Maintenance Of Branch Histories: Instruction fetch unit 110 and trace cache unit 130 maintain IFU-history1 117 and TC-history2 133 (respectively) in cooperation and synchronization with other units in pipeline 110. Instruction decode unit 120, trace cache unit 130 and write-back unit 161 control updates of respective global histories, i.e., ID-history1 121, TC-history1 132, and WB-history1 161 in order to, for example, help maintain IFU-history1 117 with current and accurate information obtained downstream (relative to instruction fetch unit 110) in pipeline 100. Write-back unit 160 also controls an additional global history (maintained at trace branch target buffer 131), WB-history2 162 in order to, for example, help maintain TC-history2 133 with current and accurate information obtained downstream (relative to trace cache unit 130) in pipeline 100. Moreover, since execution unit 150 executes instructions in an out-of-order sequence, trace branch information table 135 maintains in a table two global histories, TBIT-history1 151 and TBIT-history2 152 for each instruction it processes. TBIT-history1 151 and TBIT-history2 152 are maintained to enable pipeline 100 to recover the correct state of the global branch histories in the event that a branch instruction is mispredicted. In particular, TBIT-history1 151 is used for recovering the proper state of IFU-history1 117, and TBIT-history2 152 is used for recovering the proper state of TC-history2 133. Table 1 (below) summarizes the exemplary branch histories:

TABLE 1

| history | controlling unit | exemplary purpose |
|---|---|---|
| IFU-history1 117 | instruction fetch unit 110 | branch target buffer 113 predictions |
| ID-history1 121 | instruction decode unit 120 | maintain IFU-history1 117 |
| TC-history1 132 | trace cache unit 132 | maintain IFU-history1 117 |
| TC-history2 133 | trace cache unit 132 | trace branch target buffer 131 predictions |
| WB-history1 161 | write-back unit 160 | maintain IFU-history1 117 |
| WB-history2 162 | write-back unit 160 | maintain TC-history2 133 |
| TBIT-history1 151 | trace branch information table 135 | recover proper state of IFU-history1 117 |
| TBIT-history2 152 | trace branch information table 135 | recover proper state of TC-history2 132 |

The flowcharts of FIGS. 2–5b illustrate exemplary processes performed by units in pipeline 100 for maintaining and synchronizing branch histories. (In the following description, each element identified with a 100-series number is illustrated in FIG. 1b).

Figure 2:
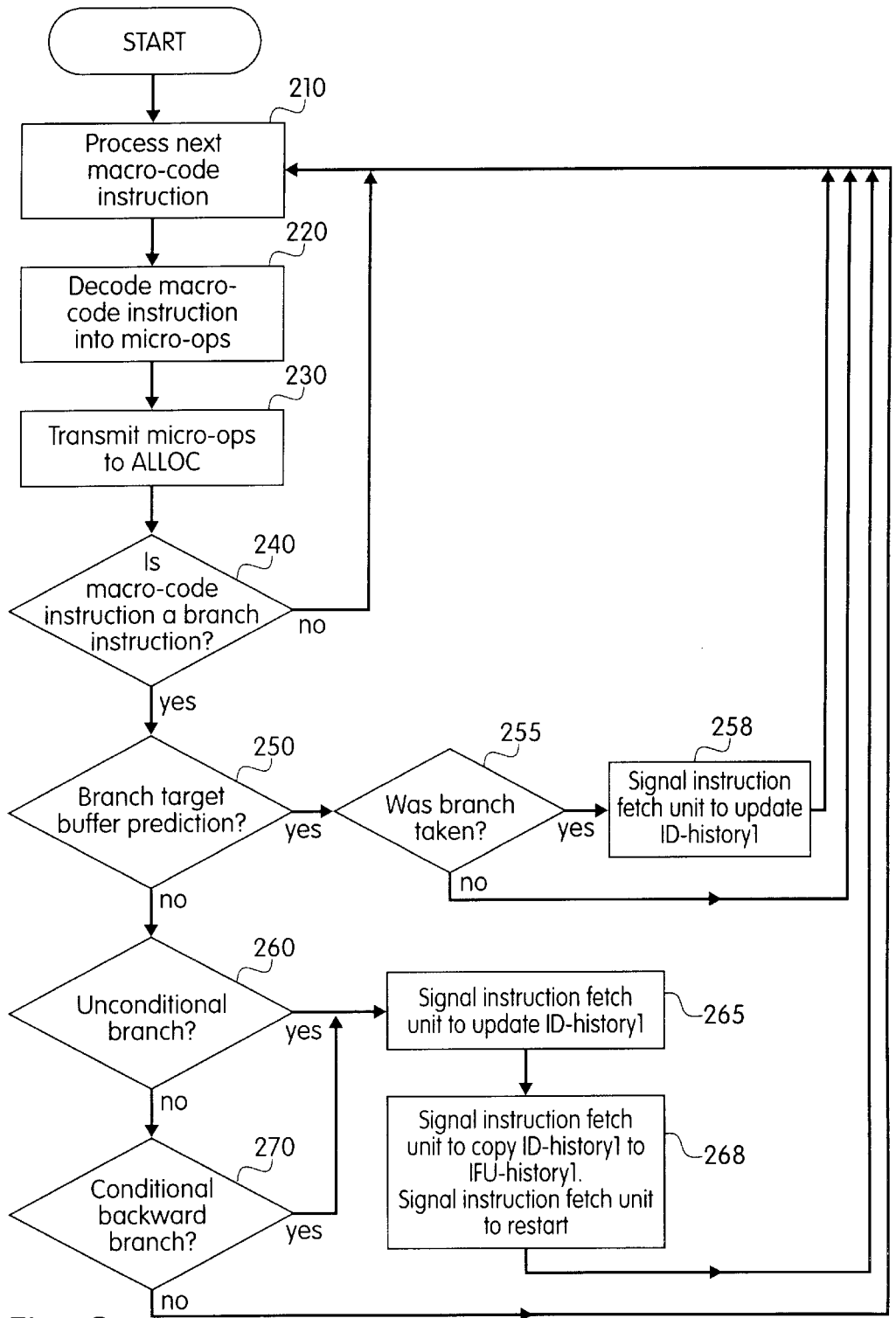
FIG. 2 is a flowchart of branch information maintenance at an instruction decoder unit in the exemplary embodiment of the present invention.

Referring now to the flowchart of FIG. 2, there is illustrated an exemplary process performed by instruction decode unit 120 in connection with maintaining branch histories. Instruction decode unit 120 continuously processes macro-code instructions from latches 112 in strict FIFO order (step 210). More specifically, instruction decode unit 120 decodes each macro-code instruction into one or a plurality of micro-ops (step 220). Each micro-op is then transmitted to allocation unit 140 (step 230).

Instruction decode unit 120 next tests the macro-code instruction to determine whether or not the instruction is a branch instruction (step 240). If the macro-code instruction is not a branch instruction, instruction decode unit 120 processes the next macro-code instruction (step 210).

If the macro-code instruction is a branch instruction, instruction decode unit 120 determines by looking at the branch prediction bit whether or not branch target buffer 113 made a branch direction prediction on the instruction (step 250). As described above, any branch direction prediction (taken or not taken) by branch target buffer 113 is transmitted in pipeline 100 along with the macro-code instruction. In the exemplary embodiment, instruction decode unit 120 does not "second guess" a prediction by branch target buffer 113. Accordingly, if branch target buffer 113 had made a branch prediction, instruction decode unit 120 simply signals instruction fetch unit 110 to update ID-history1 121, if necessary.

In particular, if branch target buffer 113 made a branch prediction, instruction decode unit 120 determines whether or not the branch instruction was taken or not taken by testing the prediction bit (step 255). If the branch was taken, instruction decode unit 120 signals instruction fetch unit 110 to update ID-history1 121 (step 258). In particular, instruction decode unit 120 transmits the branch address to instruction fetch unit 110. Instruction fetch unit 110 then determines the new value for ID-history1 121 in the same manner that a new value is determined for IFU-history1 117, i.e., new value=(old value XOR addr[3:0])<<4.

If branch target buffer 113 did not make a branch direction prediction (step 250), instruction fetch unit 110 then determines whether or not the branch instruction is an unconditional branch instruction (step 260). If the instruction is an unconditional branch, instruction decode unit 120 predicts (e.g., a static prediction) the branch will be taken when executed. Accordingly, instruction decode unit 120 signals instruction fetch unit 110 to update ID-history1 121 (step 275) in the manner described above (in reference to step 258).

Moreover, if the branch instruction is an unconditional branch instruction, branch target buffer 113 did not recognize the instruction as such (because step 250 indicated that branch target buffer 113 did not make a prediction), and therefore, did not instruct instruction fetch unit 110 to fetch instructions at the branch target address. Thus, the next instruction in pipeline 100 is not the correct instruction. Accordingly, instruction decode unit 120 signals instruction fetch unit 110 to copy ID-history1 121 to IFU-history1 117 (since ID-history1 121 now has the correct branch history, and IFU-history1 117 is not correct since it did not take the current unconditional branch into consideration) (step 275). Accordingly, the value in ID-history1 121 is effectively propagated "upstream" in pipeline 100.

Additionally, instruction decode unit 120 signals instruction fetch unit 110 to restart, in particular, to now fetch instructions beginning at the branch target address, and also to flush the portion of pipeline 100 between instruction fetch unit 110 and instruction decode unit 120 (for example, by resetting the latches 112) (step 278).

If the instruction is not an unconditional branch instruction (step 260), instruction decode unit 120 determines whether or not the branch instruction is a conditional backward branch instruction (i.e., branch target address<branch instruction address)(step 270). If so, instruction decode unit 120 predicts (i.e., a static prediction) that the branch instruction will be taken (a backward branch instruction typically appears at the end of a program loop, and is typically taken each time it is executed, except for the last time it is executed). Thus, instruction decode unit 120 signals instruction fetch unit 110 to update ID-history1 121 to reflect this branch prediction (new value=(old value XOR addr[3:0]) <<4) (step 265).

Moreover, since branch target buffer 113 did not recognize the instruction as a taken branch, the next instructions in pipeline 100 are incorrect. That is, since branch target buffer 113 did not recognize that the instruction is a taken branch, instruction fetch unit 110 must have incorrectly fetched instructions sequentially after this current branch instruction. Thus, instruction decode unit 120 signals instruction fetch unit 110 to copy ID-history1 121 to IFU-history1 117, and then signals instruction fetch unit 110 to restart pipeline 100 (step 268).

If the branch was neither an unconditional branch, nor a conditional backward branch, instruction decode unit 120 predicts that the branch will not be taken. Accordingly, it did not matter that branch target buffer 113 did not recognize the instruction to be a branch. In particular, IFU-history1 117 is still correct (since IFU-history1 117 includes information regarding only "taken" branches). Moreover, since instruction decode unit 120 has predicted the branch to be not taken, instruction decode unit 120 expects instruction fetch unit 110 to have continued to process instructions sequentially (which it did since branch target buffer 113 did not recognize the branch, thus could not have instructed instruction fetch unit 110 to take the branch). Accordingly, the next instruction is processed (step 210).

Figure 3:
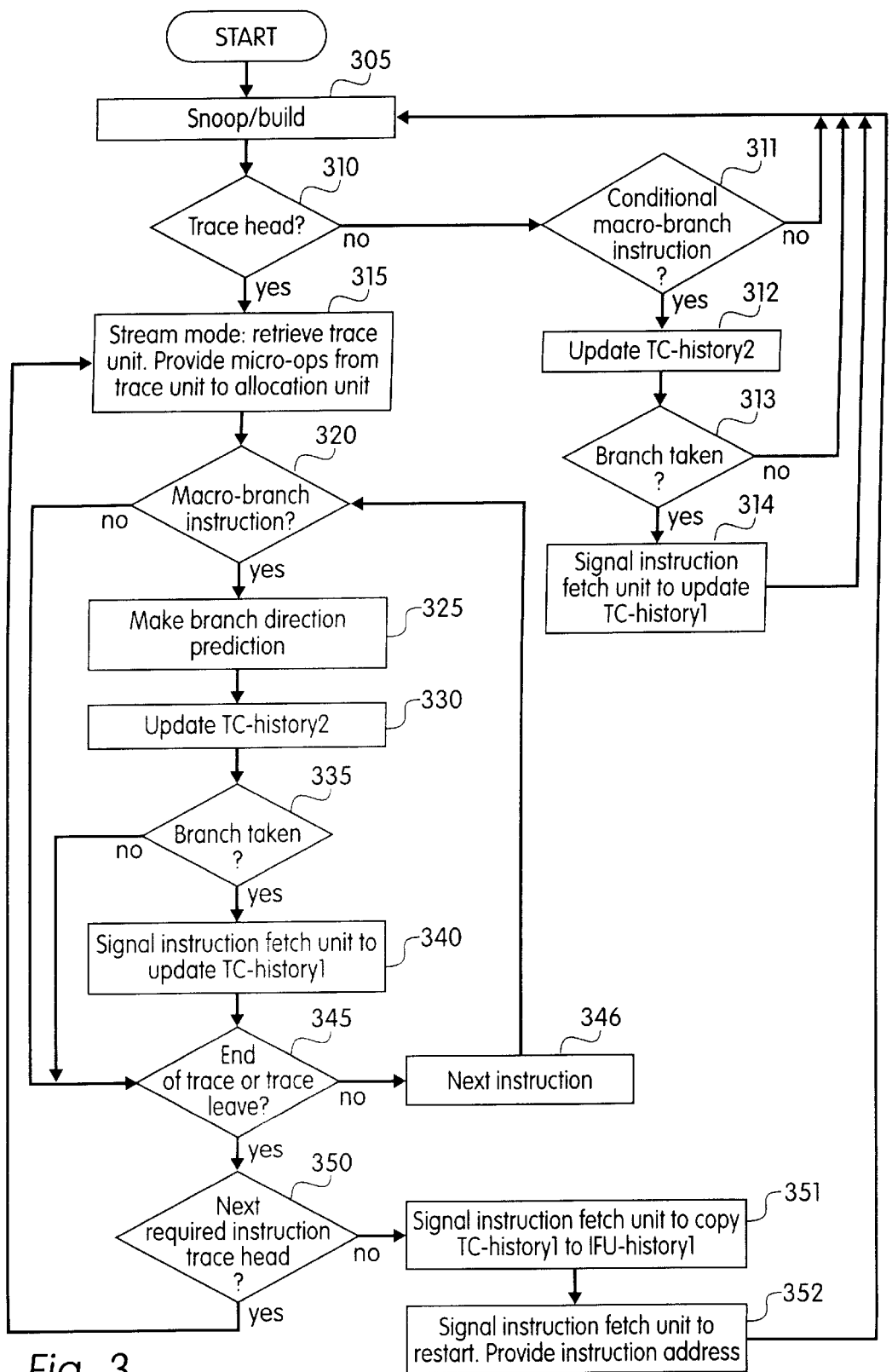
FIG. 3 is a flowchart of branch information maintenance at a trace cache unit in the exemplary embodiment of the present invention.

The flowchart of FIG. 3 illustrates an exemplary process performed by trace cache unit 130 in connection with maintaining branch histories. Referring to FIG. 3, trace cache unit 130 snoops instruction path 122 and is in build mode (step 305). Upon detecting a macro-code instruction, trace cache unit 130 tests to determine whether the macro-code instruction matches the first instruction (i.e., trace head) of any trace segment stored in its cache (step 310).

If the macro-code instruction is not a trace head, trace cache unit 130 tests the macro-code instruction and determines whether or not the instruction is a branch instruction (step 311). If not, trace cache unit 130 continues snooping the instruction path 122 (step 305).

If the macro-code instruction is a conditional branch instruction (step 311). trace cache unit 130 updates TC-history2 133 with the branch address and the branch direction prediction determined by inspecting the branch direction prediction bit described above) (step 312). In particular, trace cache unit 130 updates TC-history2 133 as follows: "new" value=("old" value XOR addr[3:01]) ·prediction.

Next, if the branch is predicted as taken (step 313), trace cache unit 130 signals instruction fetch unit 110 to update TC-history1 132 with the branch address, i.e., "new" value= ("old" value XOR addr[3:0])<<4 (step 314).

Trace cache unit 130 then continues to snoop instruction path 122 (step 305).

If the macro-code instruction is a trace head (step 310), trace cache unit 130 enters "stream mode" (step 315). In stream mode, trace cache unit 130 provides instructions from the appropriate trace segment to allocation unit 140 (step 315). Additionally, trace cache unit 130 signals instruction fetch unit 110 to discontinue fetching instructions.

For each instruction trace cache unit 130 provides to allocation unit 140, trace cache unit 130 tests whether or not the instruction is a branch instruction (step 320). If an instruction is a branch instruction, trace branch target buffer 131 predicts whether or not the branch instruction will be taken or not taken when executed (based on, at least in part, TC-history2 133) (step 325). Trace cache unit 130 then updates TC-history2 133 (step 330).

If the branch instruction is predicted as taken (step 335), trace cache unit 130 signals instruction fetch unit 110 to update TC-history1 ("new" value =("old" value XOR addr[3:0])<<4 (step 340). Otherwise, the process skips to step 345.

Next, trace cache unit 130 determines whether the current macro-code instruction is at the end of a trace segment, or a "trace leave" condition exists (step 345). A trace leave condition may exist, for example, if the trace segment includes a branch instruction, and trace branch target buffer 131 predicts that when the instruction is executed, the branch direction will be different than that assumed by the trace segment (i.e., the prediction by trace branch target buffer 131 is different than the original prediction by branch target buffer 113). If the macro-code instruction is not at the end of trace segment, and trace cache unit 130 does not detect a trace leave condition, trace cache unit 130 processes the next instruction (step 346).

If the current macro-code instruction is at the end of the trace segment, or trace cache unit 130 detects a trace leave condition, trace cache unit 130 determines whether the next required instruction is a trace head (step 350). If the next required instruction is not a trace head, instruction fetch unit 110 must begin fetching instructions again. Thus, trace cache unit 130 signals instruction fetch unit 110 to copy TC-history1 132 to ID-history1 121 and IFU-history1 117. In the exemplary embodiment, TC-history1 132 is copied to ID-history1 121 and IFU-history1 117 since the current values ID-history1 121 and IFU-history1 117 do not take into consideration any branch instruction provided by trace cache unit 130 to allocation unit 140 as does TC-history1 132 (step 351).

Finally, trace cache unit 130 signals instruction fetch unit 110 to restart (step 352).

If the next required instruction is a trace head (step 350), the next required trace segment is retrieved (step 315).

Figure 4A:
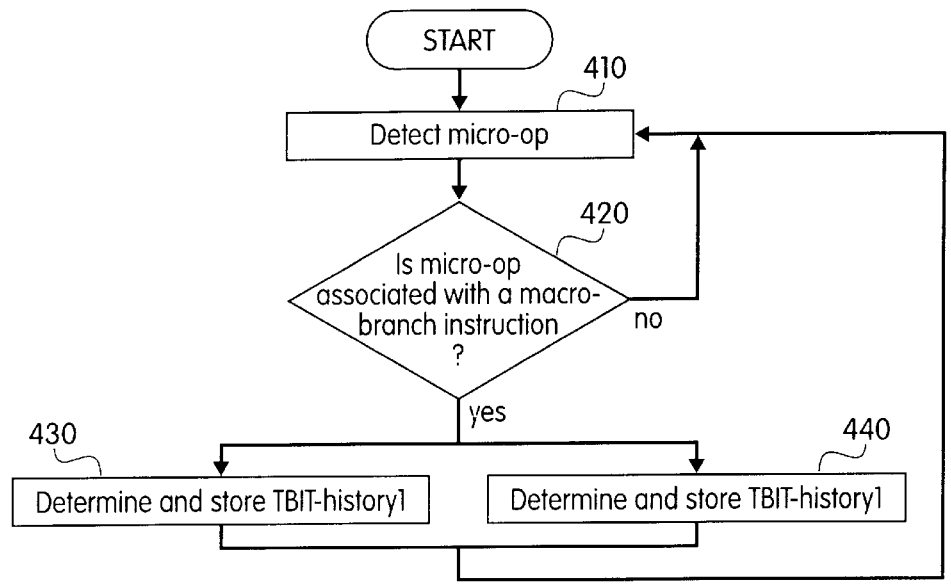
FIG. 4a is a flowchart for maintaining branch histories "in order" for an instruction pipeline having an out-of-order execution unit in accordance with the exemplary embodiment of the present invention.
Figure 4B:
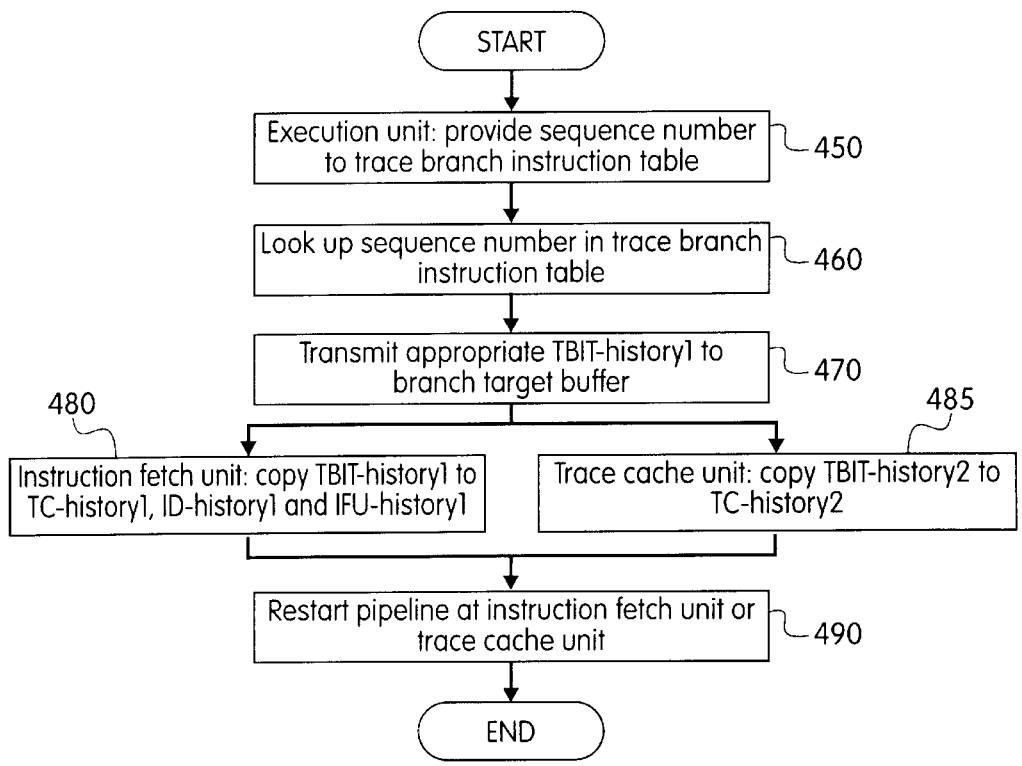
FIG. 4b is a flowchart for recovering from macro-branch mispredictions in accordance with the exemplary embodiment of the present invention.

FIG. 4a is a flowchart of the process performed by trace branch information table 135 in connection with branch history maintenance. (trace branch information table 135 is part of trace branch target buffer 131). Trace branch information table 135 maintains branch histories in order to provide a means to synchronize the branch histories in the event of a branch misprediction. In particular, execution unit 150 may detect a branch misprediction. However, since execution unit 150 processes instructions out-of-order, a special mechanism is required to enable correction of branch histories maintained upstream in pipeline 100 after a mispredicted branch is detected. Thus, in the exemplary embodiment of the present invention, trace branch information table 135 circuitry is utilized. Thus, FIG. 4a illustrates a process performed by trace branch information table 135 for maintaining branch histories "in order" for branch misprediction recovery. FIG. 4b illustrates the process performed in pipeline 100 for recovering from branch mispredictions.

Referring now to FIG. 4a, trace branch information table 135 detects micro-ops along instruction path 122 (i.e., between allocation unit 140 and instruction pool 141) (step 41 0). For each micro-op it detects, trace branch information table 135 stores certain information in its table, such as, for example, the sequence number of the micro-op. If the micro-op is associated with a macro-branch instruction (step 420), trace branch information table 135 stores enough data to recreate, for example, branch history. In the exemplary embodiment, trace branch information table 135 calculates (and stores in its table) two branch history values, TBIT-history1 151 and TBIT-history2 152 (steps 430, 440).

If the macro-branch instruction is predicted as taken, trace branch information table 135 uses the same equation used by Instruction fetch unit 110 in calculating a new branch history value for TBIT-history1 151, i.e., "new" value=("old" value XOR addr[3:0])<<4, the "old"value being the last TBIT-history1 151 calculated (for any branch instruction). If the macro-branch is predicted as not taken, trace branch information table 135 stores the "old" value in TBIT-history1 151.

To calculate the value for TBIT-history2 152 (whether the branch instruction was predicted as taken or not taken), trace branch information table 135 uses the same equation used by trace cache unit 130 in calculating a new branch history value, i.e., "new" value =("old" value XOR addr[3:0]) ·branch prediction.

FIG. 4b illustrates the process performed when execution unit 150 detects a branch misprediction. First, execution unit 150 supplies the sequence number of the current micro-op to trace branch information table 135 (the micro-op will be a branch instruction) (step 450). Trace branch information table 135 looks up in the table the entry corresponding to the sequence number (step 460). Trace branch information table 135 then transmits the TBIT-history1 151 portion of the entry to branch target buffer 112 (step 470). Additionally, instruction fetch unit 110 copies TBIT-history1 151 to TC-history1 132, ID-history1 121 and IFU-history1 117 (step 480). Additionally, trace cache unit 131 copies TBIT-history2 152 to TC-history2 133 (step 485). Finally, pipeline 100 is restarted at instruction fetch unit 110 or trace cache unit 130 (step 490).

Figure 5A:
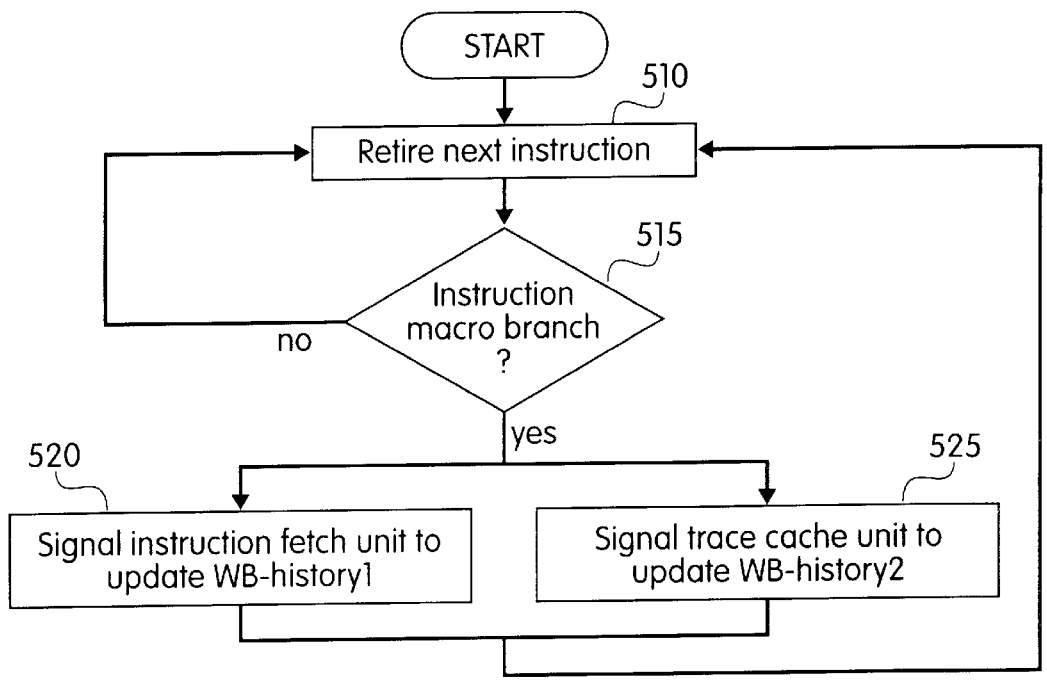
FIG. 5a is a flowchart of branch information maintenance at a write back unit in the exemplary embodiment of the present invention.

Referring now to FIG. 5a, a flowchart is provided illustrating an exemplary process performed by write-back unit 160 in cooperating in the maintenance of the branch histories. During normal operation, write-back unit 160 retires instructions in strict program order (step 510). For each a macro-branch instruction, write-back unit 160 signals instruction fetch unit 110 (if the branch instruction was taken) and trace cache unit 130 to update WB-history1 161 and WB-history2 162 respectively.

In particular, if the branch was taken, write-back unit 160 signals instruction fetch unit 110 to update WB-history1 161 as follows: "new" value=("old" value XOR addr[3:0])<<4. Similarly, write-back unit 160 signals trace cache unit 130 to update WB-history2 162 (whether the branch was taken or not taken) as follows: "new" value=("old" value XOR addr[3:0])·prediction (in this case, "prediction" is whether the branch was actually taken or not taken).

Figure 5B:
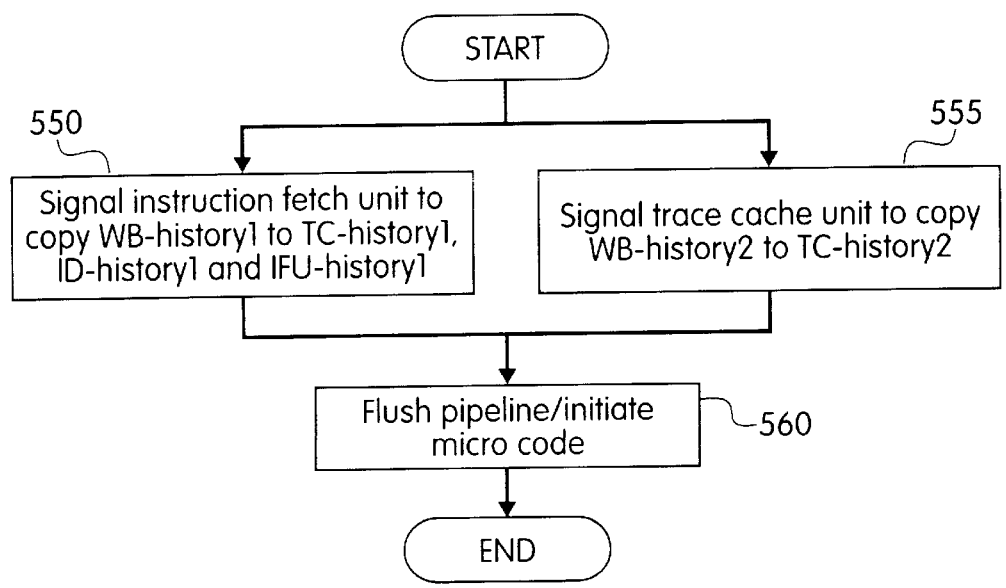
FIG. 5b is a flowchart for recovering from EVENTs and traps in accordance with the exemplary embodiment of the present invention.

The microprocessor detects certain conditions, such as EVENTS and TRAPS, which cause the microprocessor to execute machine micro-code. (EVENTS and TRAPS are conditions which are outside the scope of this discussion.) If the microprocessor EVENTS on an instruction, or a TRAP is detected, the process in FIG. 5b is performed. Referring now to FIG. 5b, write-back unit 160 signals instruction fetch unit 110 to copy WB-history1 161 to TC-history1 132, ID-history1 121, and IFU-history1 117 (step 550). Additionally, write-back unit 160 signals trace cache unit 130 to copy WB-history2 162 to TC-history2 133 (step 555). Thus the branch histories maintained by write-back unit 160 are, in effect, propagated upstream in pipeline 100.

Finally, pipeline 100 is flushed, and machine micro-code is initiated (step 560). Other Embodiments: While the present invention has been particularly shown and described with reference to exemplary embodiments thereof, it will be understood by those skilled in the art that various changes in form and details may be made therein without departing from the spirit and scope of the invention. For example, two sets of branch histories are maintained in the second exemplary embodiment, i.e., the branch histories at branch target buffer 113 (IFU-history1 117, ID-history1 121, TC-history1 132 and WB-history1 161) and TBIT-history1 151, and the branch histories at trace branch target buffer 131 (i.e., WB-history2 162 and TC-history2 133) and TBIT-history2 152. These two sets of branch histories are maintained because the pipeline 100 of the exemplary embodiment includes two units (branch target buffer 113 and trace branch target buffer 131) that perform dynamic branch predictions based on the branch histories, wherein each of the predicting units expects the history values to be calculated using a different function. If the predicting units were designed to make predictions based on branch history information calculated the same way, or pipeline 100 included only a single predicting unit, only one set of branch histories would be needed. It is possible for the predicting units to base predictions on a branch history stored in a single device. Moreover, if pipeline 100 included a third unit that made dynamic branch predictions, it is conceivable that a third set of branch histories could be maintained.

What is claimed is:

1. An instruction pipeline in a microprocessor, comprising:
   a plurality of pipeline units, each of the pipeline units processing a plurality of instructions, the plurality of instruction including a plurality of branch instructions; and
   a plurality of storage devices, each of the plurality of storage devices storing a respective branch information data and being associated with at least one of the plurality of pipeline units, each respective branch information data being determined as a function of at least one of the plurality of branch instructions processed by the at least one of the plurality of pipeline units;
   wherein a first one of the plurality of pipeline units predicts a first respective branch direction for at least one of the plurality of branch instructions processed by the first one of the plurality of pipeline units as a function of the respective branch information data stored in a first one of the plurality of storage devices, and a second one of the plurality of pipeline units predicts a second respective branch direction for at least one of the plurality of branch instructions processed by the second one of the plurality of pipeline units as a function of the respective branch information data stored in a second one of the plurality of storage devices.

2. The instruction pipeline of claim 1, wherein the first one of the plurality of pipeline units is an instruction fetch unit, the instruction fetch unit including a first branch prediction circuit.

3. The instruction pipeline of claim 2, wherein the second one of the plurality of pipeline units is a trace cache unit, the trace cache unit including a second branch prediction circuit.

4. The instruction pipeline of claim 1, wherein the respective branch information data stored in the first one of the plurality of storage devices is determined using a first function, and the respective branch information data stored in the second one of the plurality of storage devices is determined using a second function, the second function being different than the first function.

5. The instruction pipeline of claim 1, wherein a third one of the plurality of pipeline units is capable of detecting branch mispredictions, and wherein at least one of the pipeline units copies the respective branch information data stored in a first one of the plurality of storage devices to a second one of the plurality of storage devices when the third one of the plurality of pipeline units detects a branch misprediction.

6. The instruction pipeline of claim 5 wherein the third one of the plurality of pipeline units is an execution unit.

7. The instruction pipeline of claim 5, wherein the first one of the plurality of storage device is associated with a fourth one of the plurality of pipeline units, and the second one of the plurality of storage devices is associated with a fifth one of the plurality of pipeline units, the fifth one of the plurality of pipeline units being upstream in the instruction pipeline relative to the fourth one of the plurality of pipeline units.

8. The instruction pipeline of claim 5, wherein the at least one of the pipeline units is an instruction fetch unit, and the first one of the plurality of storage devices is associated with a trace cache unit and the second one of the plurality of storage devices is associated with the instruction fetch unit.

9. An instruction pipeline in a microprocessor, comprising:
   a plurality of pipeline units, each of the plurality of pipeline units processing a plurality of instructions, the subset of the plurality of instructions including a plurality of branch instructions, wherein a first one of the plurality of pipeline units operates as a first instruction source during a first time, and a second one of the plurality of pipeline units operates as a second instruction source during a second time, the second time being different than the first time; and
   a plurality of storage devices, each of the storage devices storing a respective branch information data and being associated with at least one of the plurality of pipeline units, each respective branch information data being determined as a function of a subset of the plurality of branch instructions processed by the associated at least one of the plurality of pipeline units;
   a first prediction circuit for predicting a first branch direction as a function of the respective branch information data stored in a first one of the plurality of storage devices, the first branch prediction being for at least one of the plurality of branch instructions processed by the first one of the plurality of pipeline units.

10. The instruction pipeline of claim 9, further comprising:
    a second prediction circuit for predicting a second respective branch direction as a function of the respective branch information data stored in a second one of the plurality of storage devices, the second respective branch prediction being for at least one of the plurality of branch instructions processed by the second one of the plurality of pipeline units.

11. The instruction pipeline of claim 10, wherein the first one of the plurality of storage devices and the second one of the plurality of storage devices are a same device.

12. The instruction pipeline of claim 10, wherein the respective branch information data stored in the first one of the plurality of storage devices is determined using a first function, and the respective branch information data stored in the second one of the plurality of storage devices is determined using a second function, the second function being different than the first function.

13. The instruction pipeline of claim 9, wherein a third one of the plurality of pipeline units processes instructions in an out of order sequence.

14. The instruction pipeline of claim 13, wherein at least one the storage devices includes a table, the table storing a plurality of respective branch information data, each of the plurality of branch information data corresponding to a respective instruction sequence number.

15. The instruction pipeline of claim 13, wherein the third one of the plurality of pipeline units is an execution unit.

16. The instruction pipeline of claim 9, wherein a third one of the plurality of pipeline units is capable of detecting branch mispredictions, and wherein at least one of the pipeline units copies the respective file information data stored in the first one of the plurality of storage devices to a second one of the plurality of storage devices when the third one of the plurality of pipeline units detects a branch misprediction.

17. The instruction pipeline of claim 9, wherein a third one of the plurality of pipeline units fetches a next instruction as a function of the predicted first branch direction.

18. A method for maintaining branch information in an instruction pipeline of a microprocessor, the instruction pipeline including a plurality of pipeline units, comprising the steps of:

providing a first plurality of instructions to the instruction pipeline by a first one of the plurality of pipeline units during a first time interval, the first plurality of instructions including a first branch instruction;

determining a first branch information data as a function of the first branch instruction and a value stored in a first storage device;

storing the first branch information data in a first storage device;

copying the first branch information data from the first storage device to a second storage device;

providing a second plurality of instructions to the instruction pipeline by a second one of the plurality of instruction pipeline unit during a second time interval, the second time interval being outside the first time interval, the second plurality of instructions including a second branch instruction, the second one of the plurality of pipeline units being upstream in the instruction pipeline relative to the first one of the plurality of pipeline units;

determining a second branch information data as a function of the second branch instruction and the first branch information data stored in the second storage device; and storing the second branch information data in the second storage device.

19. The method of claim 18, further comprising the step of:

predicting a branch direction for a third branch instruction as a function of the second branch information data.

20. The method of claim 18, further comprising the steps of:

allocating a sequence number to the second branch instruction;

determining a third branch information data as a function of the second branch instruction;

storing in a table entry the third branch information data, the table entry being indexed by the sequence number.

21. The method of claim 20, further comprising the steps of:

predicting a branch direction for a third branch instruction as a function of the second branch information data;

detecting a branch misprediction if the predicted branch direction is incorrect;

retrieving the third branch information data from the table entry as a function of the sequence number;

copying the third branch information data to the second storage device; and copying the third branch information data to the first storage device.

22. A method for maintaining branch information in an instruction pipeline of a microprocessor, comprising the steps of:

providing a first branch instruction to the instruction pipeline, the first branch instruction including an unresolved condition;

determining a first branch information data as a function of the first branch instruction;

storing the first branch information data in the first storage device;

predicting a branch direction of the first branch instruction as a function of the first branch information data;

determining an instruction address as a function of the predicted branch direction;

retrieving a next instruction from the determined instruction address;

providing the next instruction to the instruction pipeline;

allocating a sequence number to the first branch instruction;

determining a second branch information data as a function the first branch instruction;

storing in a table entry the second branch information data, the table entry being indexed by the sequence number;

resolving the branch condition;

determining an actual branch direction as a function of the resolving step:

comparing the actual branch direction to the predicted branch direction; and if the actual branch direction and the predicted branch direction do not match:
    retrieving the second branch information data from the table entry as a function of the sequence number;
    copying the second branch information data to the first storage device; and
    flushing the next instruction from the instruction pipeline.

23. The method of claim 22, wherein the predicting step includes predicting whether the branch instruction will be one of taken and not taken.

* * * * *